Jan. 25, 1938.    S. DURAJ    2,106,391
PLATE LIFTER
Filed July 6, 1936
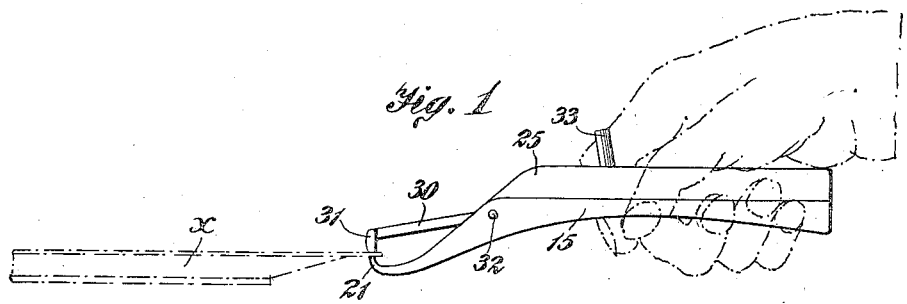
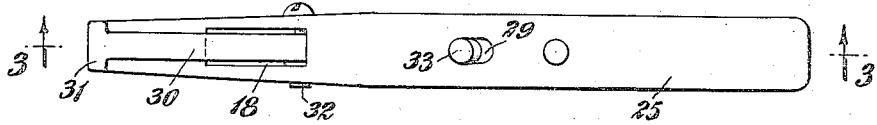
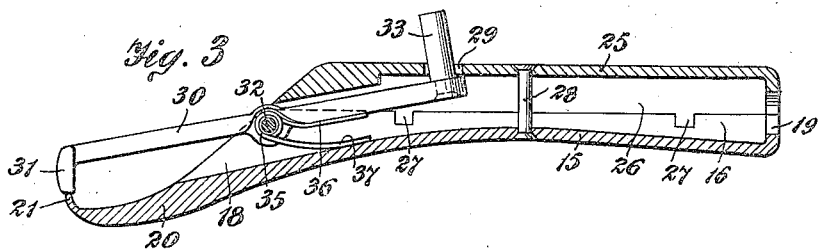
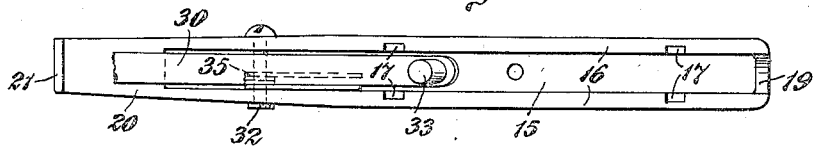
INVENTOR.
STANLEY DURAJ
BY
ATTORNEY.

Patented Jan. 25, 1938

2,106,391

UNITED STATES PATENT OFFICE 2,106,391

PLATE LIFTER

Stanley Duraj, Russelton, Pa.

Application July 6, 1936, Serial No. 88,959

1 Claim. (Cl. 294—31)

This invention relates to kitchen implements and more particularly to devices adapted to engage the marginal rims of cooking and tableware, or their covers, when in a heated condition, for removing, replacing and otherwise handling the same, with comfort, safety and security.

An object of the invention is to provide a simple, inexpensive device of this character, easily operated, even by inexperienced persons.

A further feature is in the provision of a spring actuated clamp, having a release means remote from the point of application, and operable by the same hand that is used in holding the device.

These and other meritorious purposes are accomplished by the novel construction and combination of few and simple parts, hereinafter described and shown in the accompanying drawing, forming a material part of this disclosure, and in which:

Figure 1 is a side elevational view of an embodiment of the invention, together with broken lines indicating its application.

Figure 2 is a top plan view of the device, drawn to an enlarged scale.

Figure 3 is a longitudinal sectional view taken on line 3—3 of Figure 2.

Figure 4 is a plan view of the under side of the device.

This device, which may be considered as a type of spring tong, comprises a handle composed of a lower member 15, curved and shaped to fit the hand, its main rear portion being of channel shaped cross section presenting raised sides 16.

These sides contain opposed notches 17 and are open at the front 18 and rear 19 for the passage of air.

A continuation 20 at the front of the lower member is curved downwardly and its outer extremity is upturned to constitute a gripping jaw 21.

The upper member 25 is similarly channeled presenting side walls 26 from which extend tenons 27 adapted to engage in the notches 17 of the mating member, thereby retaining the parts in registration.

The handle members are held firmly together by one or more rivets 28 having flush heads. A slot 29 is formed in the forward portion of the handle.

A lever 30 is provided at its front end with a clamp jaw 31 opposed to the fixed jaw 21, this lever being fulcrumed on a pin 32 passing through the sides 16 of the lower member of the handle.

At the inner end of the lever 30 is a thumb-knob 33 extending outwardly through the slot 29 and normally held in a raised position by a bowed compression spring 35 wound around the pin 32 and having an upper arm 36 pressed against the underside of the lever, rearwardly of its pivot, while the other arm 37 of the spring is disposed against the bottom of the channel in the handle member 15.

An example of its use and operation is shown in Figure 1 in which a pie plate X is firmly gripped, at a point near its rim, between the jaws 21—31, due to the action of the spring 35, permitting the article held by the jaws to be raised and manoeuvred as may be desired.

Release of the article is instantly accomplished by pressing the thumb-knob 33 inwardly.

It will be apparent that the device is operative not only in a horizontal position, but at any angle, so that any type of plate, pan, or other culinary article can be conveniently handled, and without danger of burning or damaging the hands of an operator.

Although the foregoing is descriptive of the best known embodiments of the invention, such changes and modifications may be resorted to as come within the purview of the claim hereto appended.

Having thus described the invention, what is claimed as new and sought to secure by Letters Patent, is:

A plate lifter comprising a hollow handle composed of upper and lower sections riveted in registration, an upturned jaw on said lower section extending outwardly beyond the upper section, a lever pivoted in said lower section, said lever having a jaw cooperative with the first named jaw, an enclosed bowed spring to close said jaws, and a rigid thumb knob on said lever extending upwardly through the main portion of said upper section to cause separation of said jaws.

STANLEY DURAJ.